(12) United States Patent
Rumsey et al.

(10) Patent No.: US 7,784,953 B2
(45) Date of Patent: Aug. 31, 2010

(54) QUICK-ATTACH MIRROR MOUNTING STRUCTURE FACILITATING ASSEMBLY

(75) Inventors: Wayne Rumsey, Zeeland, MI (US); John W. Carter, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 1423 days.

(21) Appl. No.: 10/408,516

(22) Filed: Apr. 7, 2003

(65) Prior Publication Data
US 2004/0195486 A1    Oct. 7, 2004

(51) Int. Cl.
*G02B 7/182* (2006.01)

(52) U.S. Cl. .................. 359/880; 359/872; 248/481; 248/483

(58) Field of Classification Search .......... 248/481, 248/483, 477, 475.1, 478; 403/56, 76, 90, 403/122, 1, 33, 138, 144; 359/830, 871, 359/872, 880, 881
See application file for complete search history.

(56) References Cited

U.S. PATENT DOCUMENTS

| | | | | |
|---|---|---|---|---|
| 1,806,059 | A * | 5/1931 | Hoople ................. | 248/276.1 |
| 3,367,616 | A * | 2/1968 | Bausch et al. ........... | 248/483 |
| 4,254,931 | A * | 3/1981 | Aikens et al. ........... | 248/549 |
| 4,382,572 | A * | 5/1983 | Thompson .............. | 248/484 |
| 4,632,348 | A * | 12/1986 | Keesling et al. ........ | 248/222.11 |
| 4,915,493 | A * | 4/1990 | Fisher et al. ............ | 359/874 |
| 4,936,533 | A * | 6/1990 | Adams et al. .......... | 248/222.11 |
| 5,100,095 | A * | 3/1992 | Haan et al. ............. | 248/549 |
| 5,210,948 | A * | 5/1993 | Seksaria et al. ........ | 29/894 |
| 5,321,556 | A * | 6/1994 | Joe ........................ | 359/863 |
| 5,327,288 | A * | 7/1994 | Wellington et al. ..... | 359/606 |
| 5,377,949 | A * | 1/1995 | Haan et al. ............. | 248/549 |
| 5,576,687 | A * | 11/1996 | Blank et al. ............ | 340/438 |
| 6,540,193 | B1 | 4/2003 | DeLine ................... | 248/481 |
| 6,672,730 | B1 * | 1/2004 | Hanft et al. ............ | 359/876 |
| 7,264,217 | B2 * | 9/2007 | DeLine ................... | 248/481 |

OTHER PUBLICATIONS

Alcoa Engineered Products, Excalibar 6013™, Understanding Cold Finished Aluminum Alloys, Oct. 1999, 2 pages.

* cited by examiner

*Primary Examiner*—A. Joseph Wujciak, III
(74) *Attorney, Agent, or Firm*—Price, Heneveld, Cooper, DeWitt & Litton, LLP

(57) ABSTRACT

An apparatus includes a mirror head assembly including a rearwardly-extending ball section, and a mirror support assembly including a tube having a larger-diameter mid-section and a smaller-diameter tapered end section. A socket on the mirror support assembly, when in the end section, captures the ball section with friction to permit angular adjustment but with enough friction to maintain a selected angular position. A spring biases the socket from the mid-section into the end section, but is compressible so that assembly is possible by pressing the ball section against the socket, causing the socket to move from the end section into the mid-section where the ball section snaps into the socket. It is conceived that the ball section and socket components can be reversed, and also that the mirror support assembly can include a two-ball mount, with a ball-and-socket connection at each end.

40 Claims, 3 Drawing Sheets

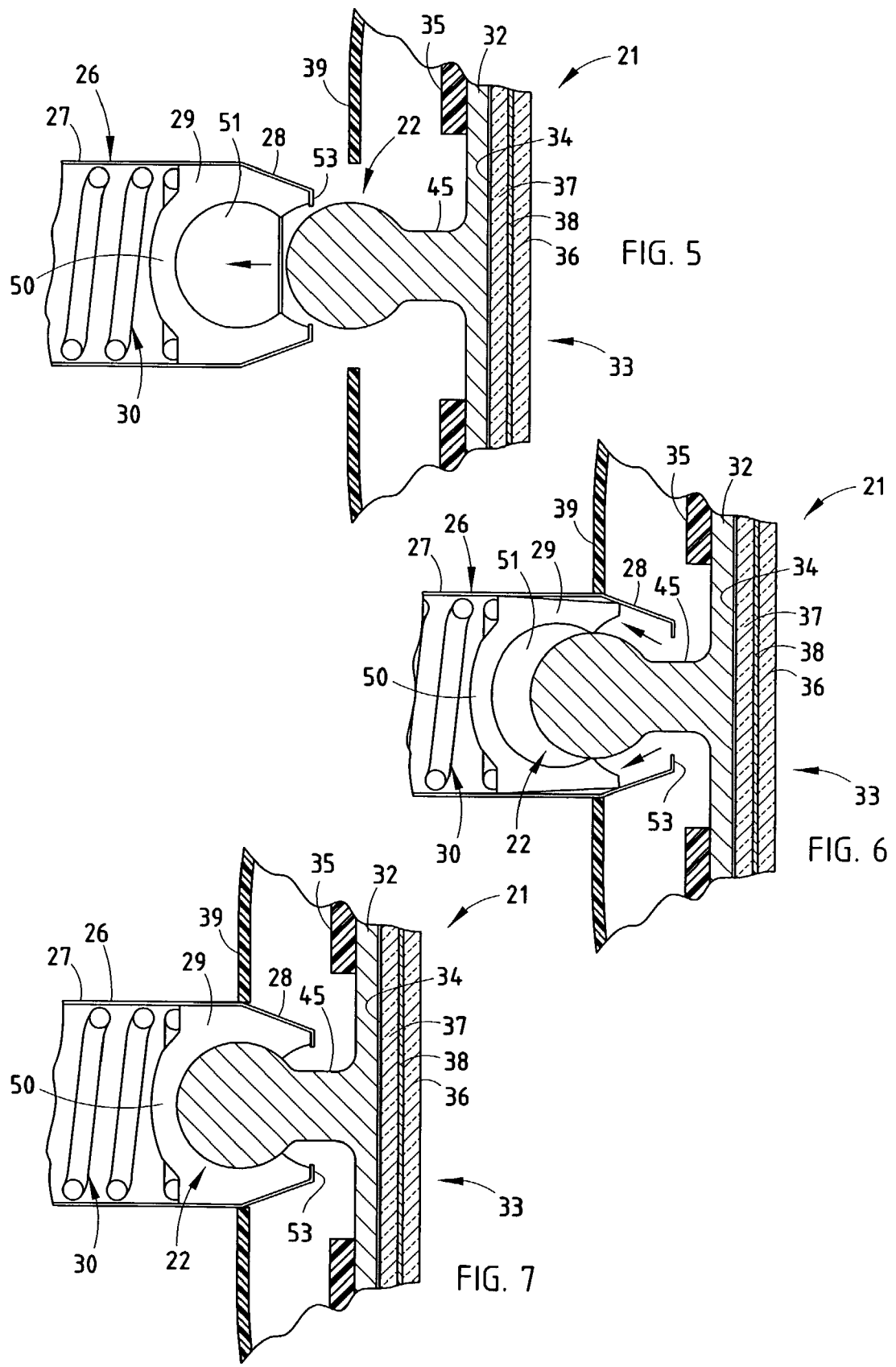

US 7,784,953 B2

QUICK-ATTACH MIRROR MOUNTING STRUCTURE FACILITATING ASSEMBLY

BACKGROUND

The present invention relates to adjustable rearview mirror mounts, and more particularly relates to a ball-and-socket connection on a mirror mount that facilitates assembly.

Most modern vehicle rearview mirrors include a ball-and-socket connection that permits angular adjustment of the mirrors for optimal rear viewing, based on the driver's physical size and individual preferences. The torsional friction generated in the ball-and-socket connections are critical for several reasons, including the need to maintain at least a minimum force of adjustment sufficient to hold a selected angular position, including the need to provide a smooth feel during adjustment so that the customer believes it to be a high-quality mirror, and including the need to stay within an expected range of force of adjustment so that all vehicle drivers are able to make adjustments relatively easily. Also, the force of adjustment must be maintained within the range for the life of the vehicle, despite wear and creeping of materials.

In order to closely control the force of adjustment, many current mirror mount designs require that the ball mount be preassembled to the mirror head (i.e. the mirror housing and components attached to the housing) prior to assembly of the mirror head itself. Preassembly of mounts is commonplace as a way of maintaining tight control over the components that result in the torsional friction of the ball-and-socket connections. However, preassembly of mounts is not a desirable situation, since the mounts and mirror housings include visible surfaces that can be scratched or damaged during subsequent assembly operations. Further, mirrors with preassembled mounts are more difficult to densely package and ship than mirror heads without mounts, since preassembled mounts extend in cantilever a distance from the mirror heads and take up space. It would be preferable to assemble mounts to the mirror at a location closer to the vehicle assembly plant. However, this cannot be done while risking a loss of tight control over the friction of the ball-and-socket connection. Still further, it is desirable to provide a mount construction that is flexible in design so that it can use existing technologies and materials, and so that it does not require the need for higher precision equipment for holding even tighter and more difficult-to-hold dimensional tolerances than already exist. It is also desirable not to add additional parts and cost to the assembly, nor to the ball-and-socket connection itself.

Another concern is energy absorption and distribution of energy by the mirror and mount combination during a vehicle crash. It is desirable to provide a mirror and mount assembly that not only does not pose a potential harm to vehicle occupants during a vehicle crash, but further that actually assists in absorbing energy and at the same time helps reduce any possibility of injury to a vehicle occupant. Also, the mirror and mount combination must not cause potential warranty problems associated with a loose or non-uniformly operating ball-and-socket connection, or that loses its strength over time due to creeping of materials and wear.

Accordingly, an apparatus is desired having the aforementioned advantages and solving the aforementioned problems.

SUMMARY OF THE PRESENT INVENTION

In one aspect of the present invention, an apparatus includes a mirror head assembly, and a mirror support assembly. A ball-and-socket connection includes a ball section on one of the mirror head assembly and the mirror support assembly, and includes a tube and a socket on the other of the mirror head assembly and the mirror support assembly. The socket is shaped to capture the ball section when in a home position in the tube, but is shiftable to a release position in the tube where the socket has room to spread to receive the ball section. A holding device holds the socket in the home position.

In another aspect of the present invention, an apparatus includes a mirror head assembly having a ball section, and a mirror support assembly includes a tube having a mid-section with a larger diameter and an end section with a smaller diameter. The mount support assembly further includes a socket that, when in the end section, is shaped to capture the ball section with friction to maintain a selected angular position but that permits angular adjustment when the friction is overcome. The mirror support assembly includes a spring biasing the socket from the mid-section into the end section. The spring is compressible so that by pressing the ball section against the socket, the socket can be moved from the end section into the mid-section where the ball section snaps into the socket.

In another aspect of the present invention, an apparatus includes a mirror head assembly, and a mirror support assembly. A ball-and-socket connection connects the mirror head assembly to the mirror support assembly. The connection includes a ball section, a tube, and a socket capturing the ball section in an end of the tube for angular adjustment. The socket and ball are shiftable within the tube so that, upon impact against the mirror head assembly, the socket and ball telescope and shift within the tube and reduce angular friction of adjustment before deformation and destruction of the mirror head assembly.

In another aspect of the present invention, an apparatus includes a mirror head assembly, and a mirror support assembly. A ball-and-socket connection connects the mirror head assembly to the mirror support assembly. The connection includes a ball section, a tube, and a socket capturing the ball section in an end of the tube for angular adjustment. The socket and ball are shiftable within the tube so that, upon impact against the mirror head assembly, the socket and ball absorb impact energy before deformation and destruction of the mirror head assembly.

In another aspect of the present invention, a method of assembly comprises steps of providing a mirror head assembly and a mirror support assembly, including a ball section on one of the mirror head assembly and the mirror support assembly, and including a tube and a socket on the other of the mirror head assembly and the mirror support assembly. The method further includes pressing the ball section against the socket to move the socket to a second position where the ball section can be moved inside the socket, and then moving the socket back to a closed home position where the ball section is retained in the socket with frictional engagement that allows angular adjustment but that provides sufficient force to maintain a selected angular position.

In still another aspect of the present invention, a method of assembly comprises steps of providing a mirror head assembly and a mirror support assembly, each including mating connecting structure. The method further includes aligning the mating connecting structure and then pressing the mirror head assembly and the mirror support assembly together to cause the mating connecting structure to interlockingly engage.

These and other aspects, objects, and features of the present invention will be understood and appreciated by those skilled in the art upon studying the following specification, claims, and appended drawings.

BRIEF DESCRIPTION OF DRAWINGS

FIGS. 5-7 are views showing press-assembly of the mirror head assembly onto the mirror support assembly;

DETAILED DESCRIPTION OF PREFERRED EMBODIMENTS

Figure 1:
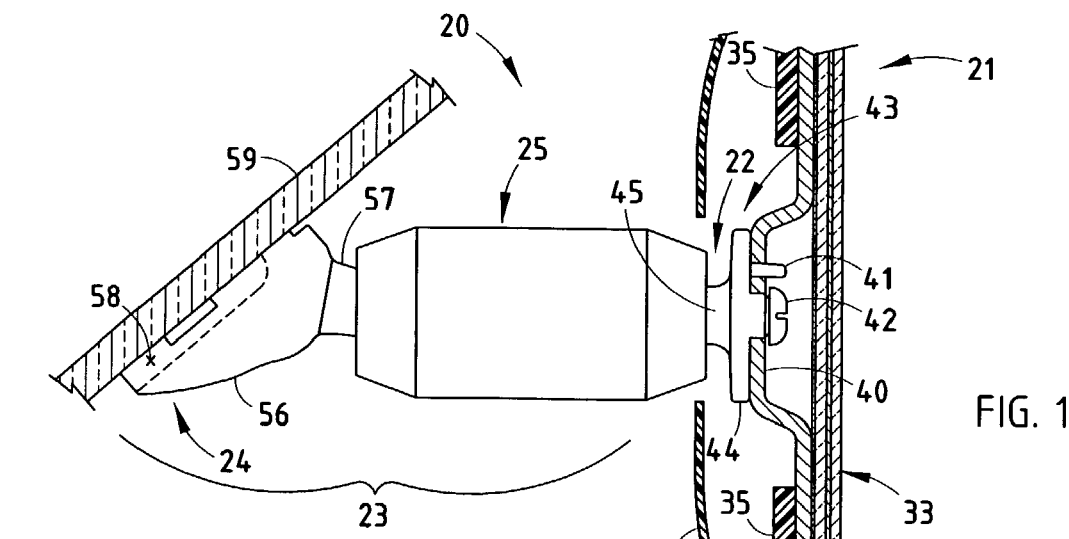
FIG. 1 is a side view of an apparatus including a mirror head assembly and a mirror support assembly supporting the mirror head assembly on a vehicle front windshield.
Figure 2:
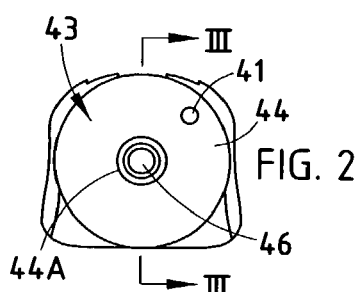
FIG. 2 is an end view of the mirror mount of FIG. 1.
Figure 3:
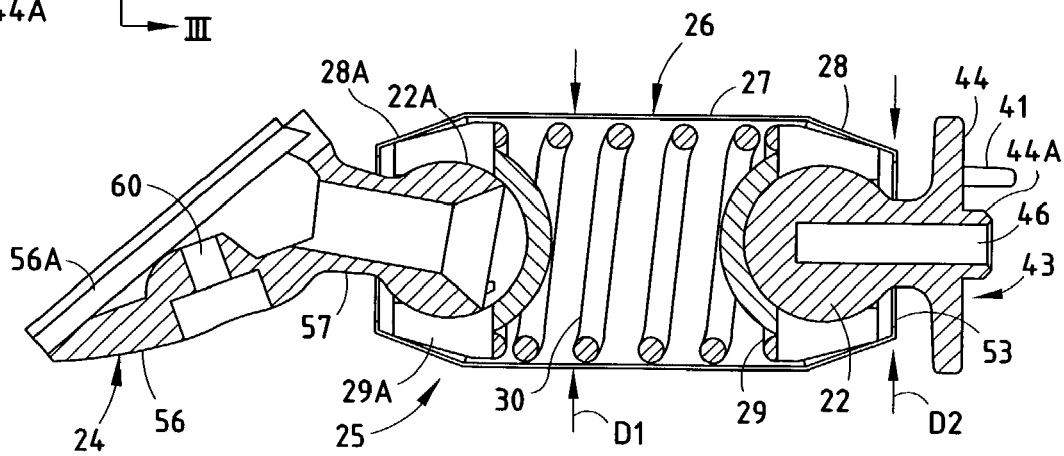
FIG. 3 is a cross section taken along the line III-III.

An apparatus 20 (FIG. 1) includes a mirror head assembly 21 including a rearwardly-extending ball section 22, and a mirror support assembly 23. The mirror support assembly 23 includes a mount 24 and a tube assembly 25. The tube assembly 25 (FIG. 3) includes a tube section 26 having a mid-section 27 defining a larger diameter D1 and a frustoconically-shaped tapered end section 28 defining a smaller diameter D2. A socket 29 is movable within the tube assembly 25 and, when in the end section 28, captures the ball section 22 with friction to permit angular adjustment but with enough friction to maintain a selected angular position. An internal coil spring 30 biases the socket 29 from the mid-section 27 into the end section 28. The spring 30 is compressible so that assembly is possible by pressing the ball section 22 against the socket 29, causing the socket 29 to temporarily move from the end section 28 into the mid-section 27. In the mid-section 27, the socket 29 expands such that the ball section 22 snaps into the socket 29. It is conceived that the ball section and socket components can be reversed, and also that the mirror support assembly can include a two-ball mount, with a ball-and-socket connection at each end, as discussed below. It is also conceived that a holder other than a spring (30) can be used to hold the socket 29 in its home position within the end section 28.

It is contemplated that the present inventive arrangement will work for different combinations of mirror head assemblies and mirror support assemblies, and therefore the present disclosure is not intended to be limited to just the illustrated components. For example, reference is made to U.S. patent application Ser. No. 09/359,144 entitled ELECTROCHROMIC DEVICES WITH THIN BEZEL-COVERED EDGE, and U.S. Pat. No. 6,431,712 entitled REARVIEW MIRROR WITH INTEGRATED FRAME, the entire contents of which are incorporated herein by reference.

The illustrated mirror head assembly 21 (FIG. 1) includes an internal plate frame 32, an electrochromic mirror subassembly 33 supported on a front of the plate frame 32 such as by adhesive tape 34, and a circuit board 35 supported on a rear of the plate frame 32. The electrochromic mirror subassembly 33 includes front and rear mirror elements 36 and 37 with electrochromic (EC) material 38 captured therebetween. A housing/back cover 39 is supported by the plate frame 32 for aesthetically covering a rear of the mirror head assembly 21. The EC material 38 is operably connected to an electrical circuit on the circuit board 34 for darkening to reduce glare. A raised flange 40 is formed on the plate frame 32, and includes a flat rear surface and a pair of holes for receiving a locator pin 41 and an attachment screw 42. A one-piece attachment component 43, such as a die-cast component, includes a washer-like base 44 with a center boss 44A, a stem 45, and the ball section 22. A hole 46 extends through the base 44 and stem 45 into the ball section 22, for receiving the screw 42. The locator pin 41 extends from the base 44, for engaging the mating hole in the raised flange 40.

Figure 4:
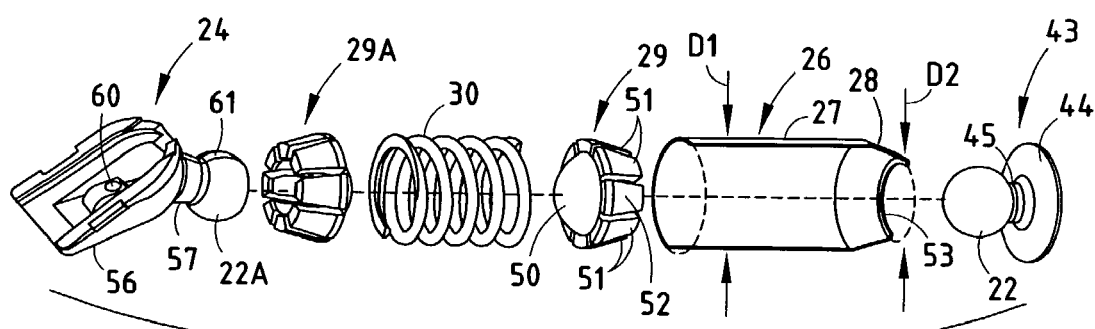
FIG. 4 is an exploded perspective view of FIG. 1.

The tube assembly 25 includes a tube 26 (FIG. 4) made from a cold finished aluminum alloy. Testing has shown that the aluminum alloy sold by ALCOA as "EXCALIBAR 6013" has been found to be particularly, surprisingly, and unexpectedly well-suited for the present invention due to its strength and ability to resist splitting and damage during assembly. The tube 26 is initially formed into a tubular shape, and cut to length. Thereafter, one end of the tube 26 is very accurately deformed (see FIG. 4) to form the first frustoconically-shaped end section 28.

The socket 29 (FIG. 4) includes a center hub 50 that is dome shaped, and includes a plurality of fingers 51 that extend from edges of the hub 50 to form a crown-like structure. The inner surface of the hub 50 and the fingers 51 define a spherical socket shape adapted to closely receive the ball section 22, and the outer surfaces 52 of the fingers 51 define a frustoconical shape that matches the shape of the frustoconically-shaped end section 28.

The spring 30 is an extensible coil spring that fits within the tube 26 and engages the socket 29, biasing the socket 29 into the end section 28 and specifically into the frustoconical shape of the end section 28. When in the end section 28 (FIG. 3), the fingers 51 are wedgingly biased inward by the angled portions of the frustoconical shape of the end section 28, thus providing sufficient inward pressure to cause a frictional resistance to angular adjustment, as required by the ball-and-socket connection formed by the ball section 22 and socket 29. Where desired, an inwardly oriented lip flange 53 is formed on the end of the end section 28 of the tube 48, to help hide sharp edges of the tube and to help reduce the opening in the end of the tube to a visually-acceptably small size (while still permitting the desired angular adjustment of the ball and socket connection). It is noted that the ends of the fingers 51 should preferably not bottom out against the inward lip flange 53, since the wedging action on the fingers 51 caused by the spring 30 biased against the socket 29 is important to maintaining adequate frictional engagement of the socket 29 on the ball section 22.

The illustrated mirror support assembly 23 (FIG. 4) comprises a two-ball mount. Specifically, the tube assembly 25 includes a second socket 29A (identical to socket 29) fit into a second end section 28A of the tube 48. The first and second sockets 29 and 29A are fit into the tube 26 with the spring 30 compressed therebetween, and the second end section 28A of the tube 26 is then deformed into a frustoconical shape, just like the end section 28. (It is not necessary that the ends sections 28 and 28A be identical, nor that the sockets 29 and 29A be identical, but it is advantageous if they are, so as to reduce the number of different components.) Notably, this operation of deforming the end section 29A can be done without interference from the mirror head assembly and without interference from the mount component 24, thus making this operation much easier to accurately perform and control.

Mount 24 (FIG. 4) includes a body 56, a stem 57 and a ball section 22A. The body 56 includes a cavity 56A shaped to slidably engage and capture edges of an anchoring clip 58 (FIG. 1) adhered/attached to a vehicle front windshield 59. A hole 60 in the body 56 (FIG. 4) receives a setscrew to fix the mount 24 to the clip 58. The ball section 22A is shaped and sized to mateably engage the socket 29A of the tube assembly 25. The illustrated mount 24 includes a slit 61 that extends along a top of the body 56, the stem 57 and the ball section 22A. The slit 61 permits lay-in of wiring and assists in wire management and routing. The wiring can be extended from the mount 24 out a side of the stem 57 and parallel an outside of the tube 26 to the mirror head assembly 21. Alternatively, holes can be put into the sockets and ball sections (see FIG. 8) to allow wiring to be routed internally through the tube 26 from the mount 24 to the mirror head assembly 21.

It is contemplated that the mirror head assembly 21 and the mirror support assembly 23 will be individually assembled and shipped as separate units, in order to optimize the densities of the components in the ship packages, and to reduce a risk of one component scratching another. It is contemplated that the mirror support assemblies 23 will have the mount 24 preassembled to the tube assembly 25, though this is not required.

To assemble a mirror support assembly 23 to a mirror head assembly 21, the socket 29 is positioned against the ball section 22 (FIG. 5) with the tube assembly 25 aligned with the stem 45 so that a "straight-on" assembly motion can be effected. The mirror head assembly 21 is preferably well-supported and uniformly supported so that the elements 36 and 37 do not break (and so that other components do not become scratched and damaged) during assembly of the mirror support assembly 23 to the mirror head assembly 21. The tube assembly 25 is then moved toward the mirror head assembly 21 (FIG. 6) causing the socket 29 against a force of the spring 30 (i.e. compress the spring 30) and to move out of the end section 28. As the socket 29 moves to the larger diameter D1 of the mid section 27 of the tube 26, the fingers 51 of the socket 29 are permitted to temporarily expand. This expands a size of a leading edge of the spherical cavity defined by the inner surfaces of the fingers 51, allowing them to snappingly receive the ball section 22. When released, the spring 30 biases the socket 29 back into the frustoconically-shaped end section 28 (FIG. 7), so that the fingers 51 now frictionally engage the ball section 22 with the requisite amount of clamping force for a good frictional ball-and-socket connection.

It is contemplated that the present apparatus embodies a very broad and inventive assembly method, including providing a mirror head assembly and a mirror support assembly, each including mating connecting structure, and aligning the mating connecting structure and then pressing the mirror head assembly and the mirror support assembly together to cause the mating connecting structure to interlockingly engage. It is contemplated that the connecting structure can be the ball-and-socket structures described above, or can include other structure that provides a quick-attach mechanism, such as mechanical, chemical, or adhesive bonding methods.

It is contemplated that the present apparatus 20 provides a novel and non-obvious repair method, which is performed by basically reversing the process of assembly described above. Specifically, for repair, the mirror support assembly 23 is biased against the mirror head assembly 21 with sufficient force to cause the socket 29 to move into the mid-section 27. A holder means must then be used to hold the socket 29 in this retracted position against the bias of the spring 30 until the ball section 22 is removed. For example, it is contemplated that a pin could be extended through a small hole in a side of the tube 26 and into securing engagement with the socket 29. Alternatively, where the mount 24 includes a slit 61, the slit 61 could be used to receive a tool for accessing an inside of the tube 26 to hold the socket 29 in a retracted position until the ball section 22 is removed.

Figure 8:
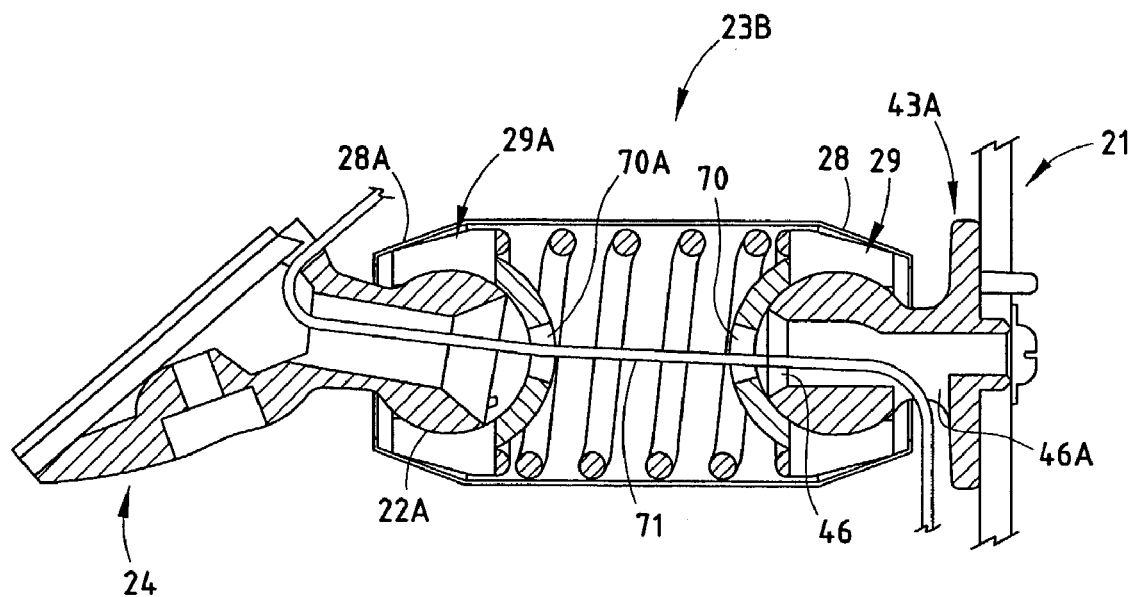
FIG. 8 is an alternative embodiment similar to FIG. 1, but defining a wire passageway.

FIG. 8 discloses a mirror support assembly 23B where the sockets 29 and 29A are modified to include holes 70 and 70A, and where the attachment component 43A includes an extended hole 46 and lateral side hole 46A. Wiring 71 is extended from the mount 24 through the tube 26 and attachment component 43A into the mirror head assembly 21.

Figure 9:
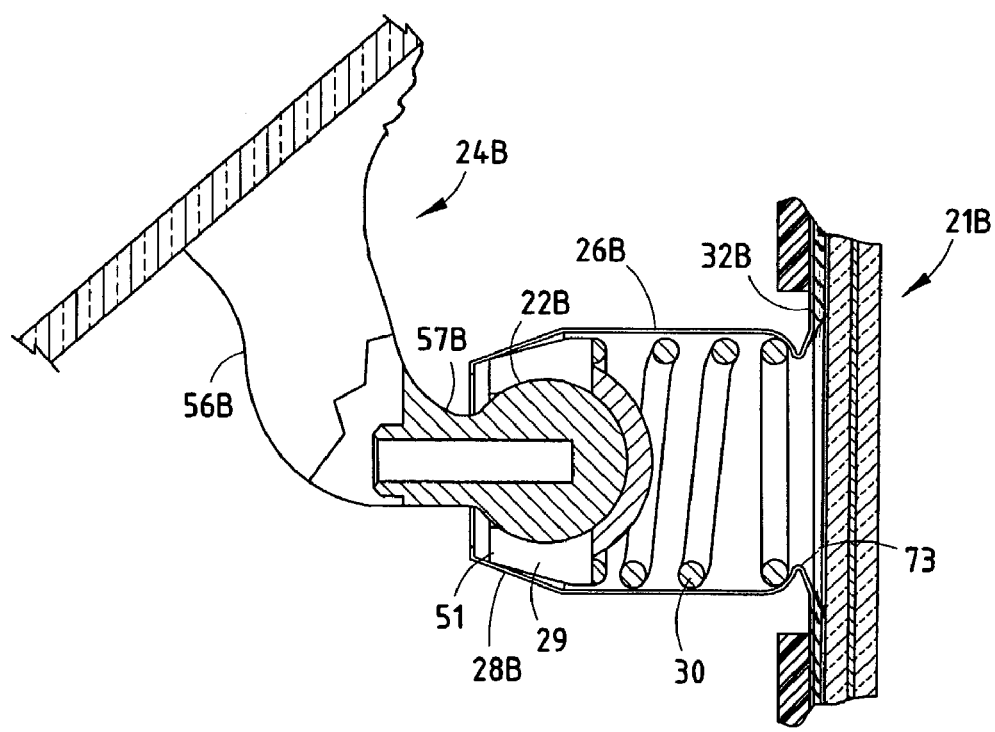
FIG. 9 is a second alternative embodiment similar to FIG. 1, but being a single-ball mount with the tube formed integrally with the mirror head assembly.

FIG. 9 shows a "one-ball" mirror supporting assembly in the form of a mount 24B having an integral ball section 22B integrally formed as part of the material of its body 56B and stem 57B. The separate tube 26 is eliminated, and is replaced by a tube 26B integrally formed from the material of the internal plate frame 32B of the mirror head assembly 21B. For example, the plate frame 32B can be made of deep-draw material, or can be cast with the tube 26B integrally formed as part thereof. Alternative, the tube 26B can be fixedly attached to the plate frame 32B such as by a screw or other means. An inner end section or "root" of the tube includes a retainer, such as the illustrated integrally-formed inwardly-deformed retainer ring 73. The spring 30 and socket 29 are initially placed within the tube 26 and the spring 30 is compressed, and then the end section 28B of the tube 26B is deformed into a frustoconical shape to wedgingly retain the socket 29 in the tapered end section 29B of the tube 26B. The spring 30 is held in a compressed state between the tapered end section 29B and the retainer ring 73, but is compressible to allow the socket 30 to move out of the tapered end section 28B far enough to allow socket fingers 51 to flex open and allow the ball section 22B to snap into the socket 29.

The present apparatus has several advantages over prior art that requires pre-assembly of a two-ball mount to a mirror head prior to assembly of internal and external components of the mirror head itself. The present apparatus allows the mirror head assembly to be fully assembled prior to attachment of the tube section (26). The present apparatus further allows for low-cost shipping (i.e. denser packaging and reduced risk of damage during shipment) and permits final assembly at a satellite or remote manufacturing site. The present apparatus further provides for increased room when crimping or inwardly deforming the tapered end section 28, since the mirror head assembly 21 and the mount 24 are not "in the way". This added room can result in a direct benefit in terms of better control over and improved accuracy of the crimping and deforming operation. As a result, there can be increased surface area on the interface of the socket 29. Specifically, the socket fingers 51 can have a thicker section, and can extend farther past a center plane of the spherical shape that they define. In other words, the inner surface of the fingers 51 can includes more surface area to engage opposing sides of the ball section (i.e. to engage the half of the ball section adjacent the mirror head assembly 21 and the half of the ball section adjacent the mirror support assembly 23), thus retaining the ball section better and providing a more uniform frictional support to the ball section. As a result, the apparatus is easier to manufacture and control. The ability to snap-attach both ends of the tube assembly 25 is also believed to provide significant manufacturing and assembly advantages, including the ability to attach selected mounts chosen from a variety of different mount configurations to various mirror head assemblies having different options thereon.

It is contemplated that the inventive concepts can be used on top mounts as well as rear mounts. The present inventive concepts can also be used on ball-and-socket connections that are offset vertically or horizontally from a center of gravity of the mirror head. The present inventive concepts can be incorporated into small-sized ball sections, such as a 15-mm size of a ball section, or in larger diameters, such as 18-mm or 22-mm ball sections. Various mirror head assemblies can be supported, such as prism mirrors, EC mirrors and non-EC mirrors. The present concepts can be incorporated into outside as well as inside mirrors.

One subtle advantage is believed to be associated with the ability of the socket 29 to move within the tube 26. During a vehicle crash, the mirror head assembly 21 is permitted to bodily move a small amount toward the vehicle's windshield. This reduces the sharpness of impact of a vehicle passenger against the mirror. As the socket 29 moves away from the tapered end section 28, the socket fingers 51 experience a loss of support, thus allowing the mirror head assembly 21 to angularly adjust and/or spin to further reduce its resistance against an impacting object, such as the head of a passenger.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. An apparatus comprising:
    a mirror head assembly;
    a mirror support assembly; and
    a ball-and-socket connection including a ball section on one of the mirror head assembly and the mirror support assembly, and including a tube and a socket on the other of the mirror head assembly and the mirror support assembly; the tube having an open end large enough for the ball section to fit through; the socket being shaped to capture the ball section when in a home position in the tube, but being shiftable to a release position in the tube where the socket has room to spread to receive the ball section as the ball section is moved through the open end; and
    a holding device shaped to hold the socket in the home position.

2. The apparatus defined in claim 1, wherein the tube has an end section with a reduced diameter.

3. The apparatus defined in claim 2, wherein the end section is frustoconically-shaped.

4. The apparatus defined in claim 3, wherein the holding device is a spring.

5. The apparatus defined in claim 4, wherein the spring biases the socket into the end section, and wherein the spring is compressible and also the socket is configured to expand when shifted out of end section.

6. The apparatus defined in claim 5, wherein the spring comprises a coil spring positioned within the tube.

7. The apparatus defined in claim 1, wherein the mirror support assembly includes a mount, the tube and the socket.

8. The apparatus defined in claim 7, wherein the mount includes a second ball section and the mirror support assembly includes a second socket shaped to capture the second ball section when in a second home position in the tube, the second socket being shiftable to a second release position in the tube where the second socket has room to spread to receive the second ball section.

9. The apparatus defined in claim 8, wherein the tube includes a second frustoconically-shaped end section.

10. The apparatus defined in claim 1, wherein the mirror head assembly includes an internal structural component that supports the ball section and to which the ball section is mechanically attached.

11. The apparatus defined in claim 1, wherein the mirror head assembly includes an internal frame and wherein the ball section is supported on the internal frame.

12. The apparatus defined in claim 1, wherein the tube is made from aluminum alloy material.

13. The apparatus defined in claim 1, wherein the tube includes an annular lip flange extending inwardly from the open end of the tube.

14. The apparatus defined in claim 1, wherein the socket includes fingers defining an opening configured to accept the ball section therethrough and into the socket, the fingers having inwardly tapered ends tapering towards the opening; and wherein the ball section abuts the inwardly tapered ends of the fingers to move the fingers outward as the ball section is moved through the opening and into the socket.

15. The apparatus defined in claim 14, wherein the tapered ends of the fingers are arcuate.

16. The apparatus defined in claim 14, wherein the tapered ends of the fingers define a portion of a sphere.

17. An apparatus comprising:
    a mirror head assembly including a ball section; and
    a mirror support assembly including a tube having a midsection with a larger diameter and an end section with a smaller diameter and defining an open end; the mirror support assembly further including a socket that, when in the end section, is shaped to capture the ball section with friction to maintain a selected angular position but that permits angular adjustment when the friction is overcome; the mirror support assembly including a spring biasing the socket from the mid-section into the end section, but the spring being compressible so that by pressing the ball section against the socket, the socket can be moved from the end section into the mid-section permitting the ball section to move through the open end and snap into the socket;
    wherein the mirror support assembly includes a mount, the tube, the spring, and the socket; and
    wherein the mount includes a second ball section and the mirror support assembly includes a second socket shaped to capture the second ball section when in a second home position in the tube, the second socket being shiftable to a second release position in the tube where the second socket has room to spread to receive the second ball section.

18. The apparatus defined in claim 17, wherein the end section is frustoconically-shaped.

19. The apparatus defined in claim 17, wherein the mirror head assembly includes a structural component having the ball section mechanically attached thereto.

20. The apparatus defined in claim 17, wherein the mirror head assembly includes an internal frame and wherein the ball section is supported on the internal frame.

21. The apparatus defined in claim 17, wherein the tube comprises an aluminum alloy material.

22. The apparatus defined in claim 17, wherein the socket includes fingers defining an opening configured to accept the ball section therethrough and into the socket, the fingers having inwardly tapered ends tapering towards the opening; and wherein the ball section abuts the inwardly tapered ends of the fingers to move the fingers outward as the ball section is moved through the opening and into the socket.

23. The apparatus defined in claim 22, wherein the tapered ends of the fingers are arcuate.

24. The apparatus defined in claim 22, wherein the tapered ends of the fingers define a portion of a sphere.

25. An apparatus comprising:
    a mirror head assembly including a ball section; and a mirror support assembly including a tube having a mid-section with a larger diameter and an end section with a smaller diameter and defining an open end; the mirror support assembly further including a socket that, when in the end section, is shaped to capture the ball section with friction to maintain a selected angular position but that permits angular adjustment when the friction is overcome; the mirror support assembly including a spring biasing the socket from the mid-section into the end section, but the spring being compressible so that by pressing the ball section against the socket, the socket can be moved from the end section into the mid-section permitting the ball section to move through the open end and snap into the socket;

wherein the end section is frustoconically-shaped; and wherein the socket is configured to expand when shifted out of end section.

26. The apparatus defined in claim 25, wherein the spring comprises a coil spring positioned in the tube.

27. An apparatus comprising:

a mirror head assembly;

a mirror support assembly; and a ball-and-socket connection connecting the mirror head assembly to the mirror support assembly, the connection including a ball section, a tube with an open end larger than the ball section, a spring within the tube, and a socket biased by the spring capturing the ball section in an end of the tube for angular adjustment, the socket and ball section being shiftable within the tube to move the socket away from the open end and the spring being compressible to a location where the socket is expandable to telescopingly receive the ball section for permitting assembly and disassembly.

28. The apparatus defined in claim 27, wherein the tube is made from an aluminum alloy.

29. The apparatus defined in claim 27, wherein the tube includes an annular lip flange extending inwardly from the open end of the tube.

30. The apparatus defined in claim 27, wherein the socket includes fingers defining an opening configured to accept the ball section therethrough and into the socket, the fingers having inwardly tapered ends tapering towards the opening; and wherein the ball section abuts the inwardly tapered ends of the fingers to move the fingers outward as the ball section is moved through the opening and into the socket.

31. The apparatus defined in claim 30, wherein the tapered ends of the fingers are arcuate.

32. The apparatus defined in claim 30, wherein the tapered ends of the fingers define a portion of a sphere.

33. An apparatus comprising:

a mirror head assembly;

a mirror support assembly; and a ball-and-socket connection connecting the mirror head assembly to the mirror support assembly, the connection including a ball section, a tube with an end section and an open end larger than the ball section, and a socket capturing the ball section in the end section of the tube for angular adjustment, the socket and ball section being shiftable within the tube to partially remove the socket from the end section so that fingers of the socket can flex radially to telescopingly receive the ball section during assembly.

34. The apparatus defined in claim 33, wherein the tube includes an annular lip flange extending inwardly from the open end of the tube.

35. The apparatus defined in claim 33, wherein the socket includes fingers defining an opening configured to accept the ball section therethrough and into the socket, the fingers having inwardly tapered ends tapering towards the opening; and wherein the ball section abuts the inwardly tapered ends of the fingers to move the fingers outward as the ball section is moved through the opening and into the socket.

36. The apparatus defined in claim 35, wherein the tapered ends of the fingers are arcuate.

37. The apparatus defined in claim 35, wherein the tapered ends of the fingers define a portion of a sphere.

38. An apparatus comprising:

a mirror head assembly including a ball section; and a mirror support assembly including a tube having a mid-section with a larger diameter and an end section with a smaller diameter and defining an open end; the mirror support assembly further including a socket that, when in the end section, is shaped to capture the ball section with friction to maintain a selected angular position but that permits angular adjustment when the friction is overcome; the mirror support assembly including a spring biasing the socket from the mid-section into the end section, but the spring being compressible so that by pressing the ball section against the socket, the socket can be moved from the end section into the mid-section permitting the ball section to move through the open end and snap into the socket;

wherein the tube includes an annular lip flange extending inwardly from the open end of the tube.

39. A method of assembly comprising steps of:

providing a mirror head assembly and a mirror support assembly, including a ball section on one of the mirror head assembly and the mirror support assembly, and including a tube and a socket on the other of the mirror head assembly and the mirror support assembly;

pressing the ball section against the socket to move the socket to a second position where the ball section can be moved inside the socket; and moving the socket back to a closed home position where the ball section is retained in the socket with frictional engagement that allows angular adjustment but that provides sufficient force to maintain a selected angular position;

wherein the tube has an open end larger than the ball section but smaller than the socket; and pressing the ball section against the socket includes pressing the ball section through the open end.

40. The method of assembly defined in claim 39, wherein the tube includes an annular lip flange extending inwardly from the open end of the tube.

* * * * *